US011372600B2

(12) United States Patent
Asai

(10) Patent No.: US 11,372,600 B2
(45) Date of Patent: Jun. 28, 2022

(54) COMPUTER-READABLE MEDIUM, INFORMATION PROCESSING DEVICE, AND METHOD FOR CAUSING A TARGET DEVICE TO PERFORM A REGISTERED WORKFLOW

(71) Applicant: BROTHER KOGYO KABUSHIKI KAISHA, Nagoya (JP)

(72) Inventor: Norihiko Asai, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 37 days.

(21) Appl. No.: 16/814,438

(22) Filed: Mar. 10, 2020

(65) Prior Publication Data

US 2020/0293238 A1 Sep. 17, 2020

(30) Foreign Application Priority Data

Mar. 14, 2019 (JP) ............................ JP2019-046810

(51) Int. Cl.
*G06F 3/12* (2006.01)
*H04L 67/12* (2022.01)

(52) U.S. Cl.
CPC .......... *G06F 3/1207* (2013.01); *G06F 3/1255* (2013.01); *H04L 67/12* (2013.01)

(58) Field of Classification Search
CPC .... G06F 3/1207; G06F 3/1255; G06F 3/1261; G06F 3/1292; G06F 3/1257; G06F 3/1205; H04L 67/12; H04L 67/125; H04N 1/3255
See application file for complete search history.

(56) References Cited

U.S. PATENT DOCUMENTS 9,942,423 B2 * 4/2018 Yamada ............. H04N 1/00912
2005/0018236 A1 * 1/2005 Shirai ................... G06F 3/1261 358/1.14
2006/0098581 A1 * 5/2006 Kenghe ................. H04L 49/602 370/252
2011/0286022 A1 * 11/2011 Kakitsuba ............ G06F 3/1232 358/1.13

(Continued)

FOREIGN PATENT DOCUMENTS

JP 2002-149011 A 5/2002
JP 2016-157232 A 9/2016

*Primary Examiner* — Huo Long Chen
(74) *Attorney, Agent, or Firm* — Scully Scott Murphy and Presser

(57) ABSTRACT

A non-transitory computer-readable medium stores program instructions executable by a processor of an information processing device that includes a storage, an operation interface, a display, and a communication interface configured to communicate with a plurality of devices. The program instructions are configured to, when executed by the processor, cause the information processing device to set a first device selected from among the plurality of devices as a target device to perform a particular process registered in the storage, when receiving an operation to change the target device from the first device to a second one of the plurality of devices via the operation interface, determine whether the second device is capable of performing the particular process, and control the display to display a result of the determination as to whether the second device is capable of performing the particular process.

12 Claims, 7 Drawing Sheets

(56) References Cited

U.S. PATENT DOCUMENTS

| | | | | |
|---|---|---|---|---|
| 2012/0081745 | A1* | 4/2012 | Asai | G06F 3/1273 358/1.15 |
| 2015/0199157 | A1* | 7/2015 | Xiao | G06F 3/1236 358/1.15 |
| 2017/0251124 | A1* | 8/2017 | Yasui | G06F 3/1292 |
| 2019/0182404 | A1* | 6/2019 | Sato | H04N 1/32539 |

* cited by examiner

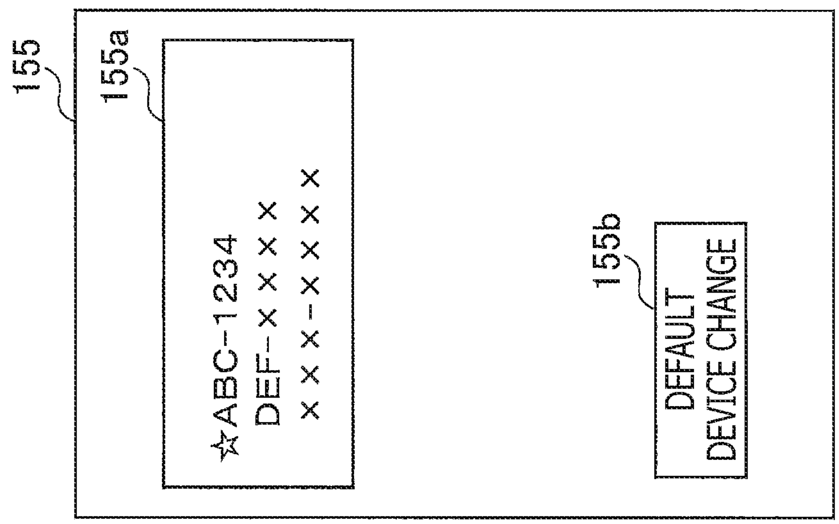
FIG. 2D
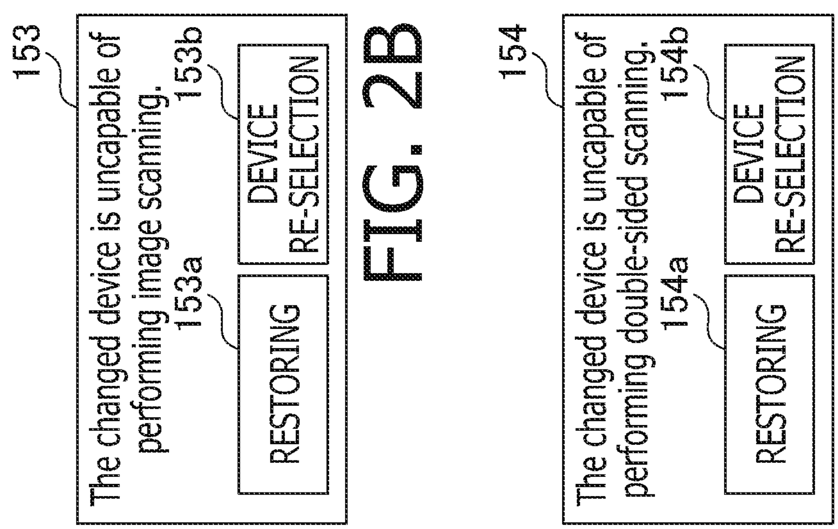
FIG. 2B
FIG. 2C
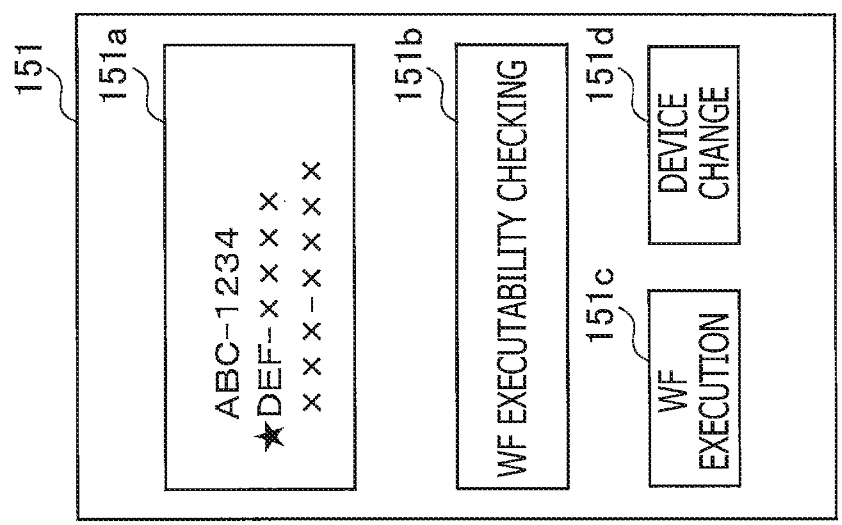
FIG. 2A

COMPUTER-READABLE MEDIUM, INFORMATION PROCESSING DEVICE, AND METHOD FOR CAUSING A TARGET DEVICE TO PERFORM A REGISTERED WORKFLOW

CROSS-REFERENCE TO RELATED APPLICATION

This application claims priority under 35 U.S.C. § 119 from Japanese Patent Application No. 2019-046810 filed on Mar. 14, 2019. The entire subject matter of the application is incorporated herein by reference.

BACKGROUND

Technical Field

Aspects of the present disclosure are related to a non-transitory computer-readable medium, an information processing device, and a method for registering a workflow as a sequence of processes executable in response to a single operation and causing a target device to perform the registered workflow.

Related Art

A technology has been known in which a processing execution device (e.g., a multi-function peripheral) reads out shortcut information stored in an external memory (e.g., a USB memory) and registers the read shortcut information in association with an operable element (e.g., a software key or a hardware key) of the processing execution device. In the known technology, the shortcut information may be set to be usable in association with the operable element in a different manner depending on whether the processing execution device is capable of performing a sequence of processes registered with the shortcut information.

SUMMARY

However, the known technology does not take into account how an application program works when a target device to perform a registered workflow has been changed from one device to another among a plurality of processing execution devices by a terminal device executing the application program.

Aspects of the present disclosure are advantageous to provide one or more improved techniques for informing a user of whether a target device, after changed from one device to another, is capable of performing a registered workflow.

According to aspects of the present disclosure, a non-transitory computer-readable medium is provided, which stores program instructions executable by a processor of an information processing device including a storage, an operation interface, a display, and a communication interface configured to communicate with a plurality of devices. The program instructions are configured to, when executed by the processor, cause the information processing device to set a first device selected from among the plurality of devices as a target device to perform a particular process registered in the storage, determine, when receiving an operation to change the target device from the first device to a second one of the plurality of devices via the operation interface, whether the second device is capable of performing the particular process, and control the display to display a result of the determination as to whether the second device is capable of performing the particular process.

According to aspects of the present disclosure, further provided is an information processing device that includes a storage, an operation interface, a display, a communication interface configured to communicate with a plurality of devices, and a controller. The controller is configured to set a first device selected from among the plurality of devices as a target device to perform a particular process registered in the storage, determine, when receiving an operation to change the target device from the first device to a second one of the plurality of devices via the operation interface, whether the second device is capable of performing the particular process, and control the display to display a result of the determination as to whether the second device is capable of performing the particular process.

According to aspects of the present disclosure, further provided is a method implementable on a processor of an information processing device including a storage, an operation interface, a display, and a communication interface configured to communicate with a plurality of devices. The method includes setting a first device selected from among the plurality of devices as a target device to perform a particular process registered in the storage, determining, when receiving an operation to change the target device from the first device to a second one of the plurality of devices via the operation interface, whether the second device is capable of performing the particular process, and controlling the display to display a result of the determination as to whether the second device is capable of performing the particular process.

BRIEF DESCRIPTION OF THE ACCOMPANYING DRAWINGS

FIG. 2A shows an example of a WF setting-execution screen to be displayed on a display of the smartphone in the illustrative embodiment according to one or more aspects of the present disclosure.

FIGS. 2B and 2C illustrate pop-up windows for error displays on the display of the smartphone in the illustrative embodiment according to one or more aspects of the present disclosure.

FIG. 2D shows an example of a default device setting screen to be displayed on the display of the smartphone in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
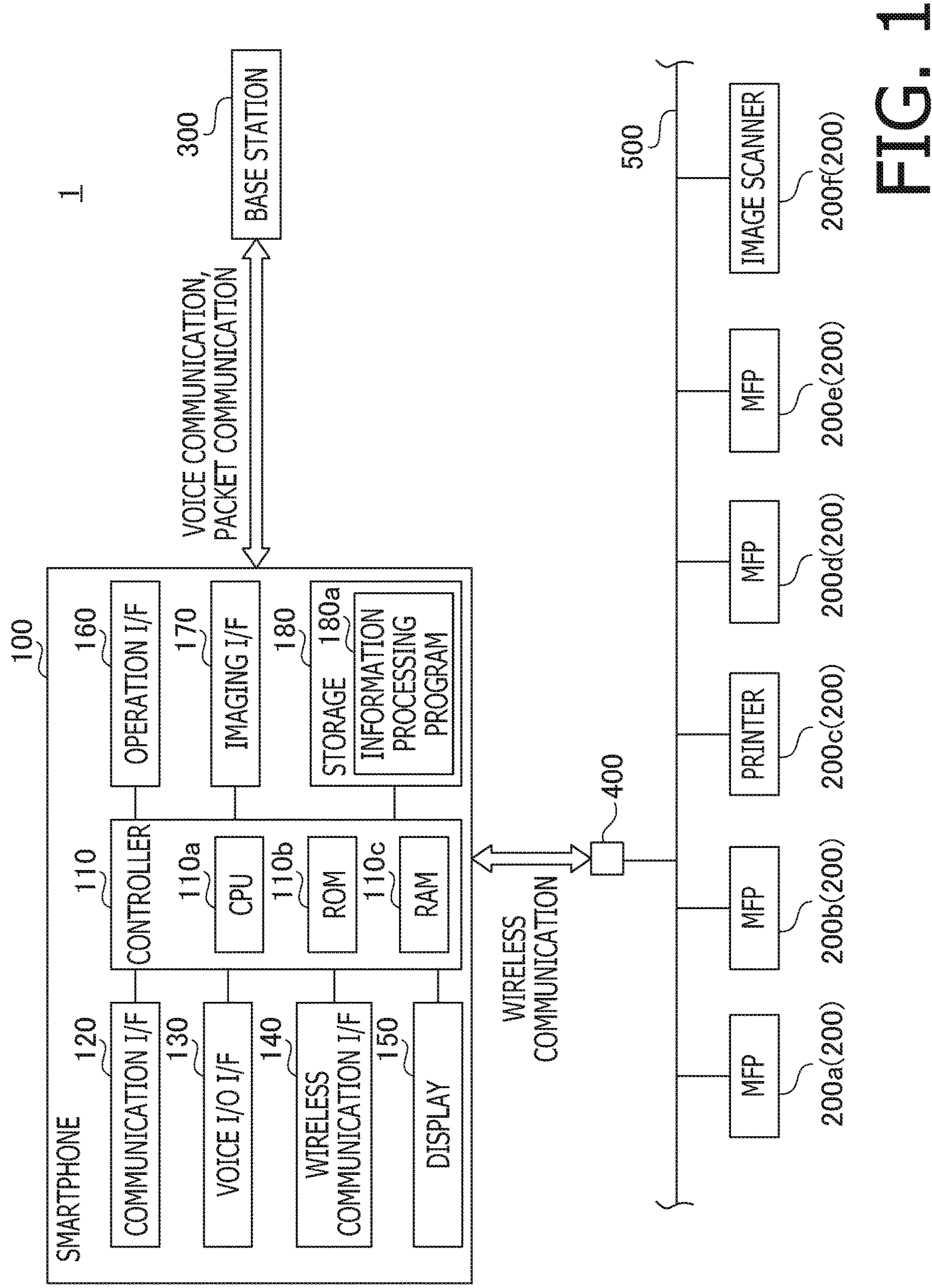
FIG. 1 is a block diagram schematically showing a configuration of a system including a smartphone to execute an information processing program and a plurality of devices connected with the smartphone via a communication network, in an illustrative embodiment according to one or more aspects of the present disclosure.

FIG. 1 schematically shows a configuration of a system 1 including a smartphone 100 to execute an information processing program 180*a* and various devices 200 communicably connected with the smartphone 100. The smartphone 100 has a wireless communication function as well as a voice communication function. Specifically, the smartphone 100 is wirelessly connected with a communication network 500, for instance, via a wireless LAN router 400.

Each of multi-function peripherals (hereinafter referred to as "MFPs") 200*a*, 200*b*, 200*d*, and 200*e* has a plurality of functions such as a printing function, a scanning function, and a facsimile function. The MFPs 200*a*, 200*b*, 200*d*, and 200*e* may be manufactured by different makers, respectively, or may be of different models of a same maker, respectively. For instance, the MFP 200*a* may have a printing function to perform printing in an inkjet method and a scanning function to perform image scanning in a flatbed method (hereinafter referred to as an "FB method"). Further, the MFP 200*b* may have a printing function to perform color printing in a laser printing method and a scanning function to perform image scanning using an automatic document feeder (hereinafter referred to as an "ADF") as well as image scanning in the FB method.

A printer 200C has a printing function to perform monochrome printing in a laser printing method. An image scanner 200*f* has a scanning function. The printer 200C and the image scanner 200*f* may be manufactured by different makers, respectively, or may be of different models of a same maker, respectively.

In the following description, what is simply referred to as a "device 200" may represent one of the plurality of devices 200*a* to 200*f*.

The smartphone 100 includes a controller 110, a communication I/F ("I/F" is an abbreviation of "interface") 120, a voice input/output I/F 130, a wireless communication I/F 140, a display 150, an operation I/F 160, an imaging device 170, and a storage 180.

The controller 110 includes a CPU 110*a*, a ROM 110*b*, and a RAM 110*c*. The CPU 110*a* is configured to execute various programs stored in memories such as the ROM 110*b* and the storage 180, thereby controlling each element included in the smartphone 100. The ROM 110*b* stores data and programs executable by the CPU 110*a*. The RAM 110*c* is used as a temporary storage for the CPU 110*a* performing various processes.

The communication I/F 120 includes an antenna, an RF ("RF" is an abbreviation of "Radio Frequency") circuit, and a baseband processor. The communication I/F 120 is configured to perform voice signal communication with a base station 300 via the antenna. Further, the communication I/F 120 is configured to perform packet communication with the base station 300.

The voice input/output I/F 130 includes a microphone, a speaker, and a sound processing circuit. The voice input/output I/F 130 is configured to transmit a voice signal input via the microphone to the base station 300 and to produce, through the speaker, audible sound based on a voice signal received from the base station 300.

The wireless communication I/F 140 is configured in compliance with a wireless communication standard such as Wi-Fi (IEEE 802.11a/IEEE 802.11b) (registered trademark). The wireless communication I/F 140 is configured to establish a wireless connection with the communication network 500 (e.g., a LAN and the Internet) via the wireless LAN router 400.

It is noted that the wireless communication standard for the wireless communication I/F 140 is not limited to Wi-Fi (IEEE 802.11a/IEEE 802.11b) but may be any type of wireless communication standard as long as it allows the smartphone 100 to wirelessly connect with the communication network 500. For instance, the smartphone 100 may be configured to wirelessly connect with the communication network 500 via Bluetooth (IEEE 802.15.1) (registered trademark) or wireless infrared communication according to an IrDA protocol.

In the illustrative embodiment, an exemplary case where the smartphone 100 is wirelessly connected with the communication network 500 will be described. Nonetheless, it is noted that the smartphone 100 may be connected with the communication network 500 in a wired manner.

The display 150 includes a display device (e.g., an LCD device or an organic EL display device) and a drive circuit for driving the display device.

The operation I/F 160 includes a substantially transparent touch panel to cover a display surface of the display, a control circuit for controlling the touch panel, and operable buttons. A user may input a phone number or an instruction to an application program via the operation I/F 160.

The imaging device 170 includes an area image sensor, an optical system, an analog front-end, and an image processor. The imaging device 170 is configured to image an object, thereby generating digital image data.

The storage 180 includes a non-volatile memory such as a flash memory, and is configured to store programs and data. Specifically, the storage 180 stores an OS, application programs including the information processing program 180*a*, and data.

Each of the application programs (hereinafter, simply referred to as "applications") such as the information processing program 180*a* may be downloaded from an external server via the communication I/F 120 or the wireless communication I/F 140. In another instance, the smartphone 100 may have a USB ("USB" is an abbreviation of "Universal Serial Bus") I/F. In this case, each application may be downloaded from the external server via the USB I/F.

Referring to FIGS. 2 to 5, a detailed explanation will be provided of distinctive processes to be performed by the smartphone 100 executing the information processing program 180*a*.

When the information processing program 180*a* is launched, a plurality of icons are displayed on the display 150 of the smartphone 100. Each of the icons is configured to, when tapped, provide an instruction to start a corresponding process. For instance, when the user taps one of the icons, a process associated with the tapped icon is started. It is noted that "tapping" may be a user operation of pressing an object on the operation I/F 160, for instance, by a finger of the user. In this case, when the object is tapped by the user, a process associated with the tapped object may be performed, or a screen associated with the tapped object may be opened (the same applies hereinafter).

Among the plurality of icons displayed on the display 150, what is used in the illustrative embodiment is a WF icon (not shown) and a default device setting icon (not shown). The WF icon is for starting a WF main routine to set and perform a workflow (which may be simply referred to as a "WF"). The default device setting icon is for starting a default device setting process to set a default device for the smartphone 100. It is noted that the WF represents a sequence of processes to be performed in response to a single operation.

FIG. 2A shows an example of a WF setting-execution screen 151 to be displayed when the WF main routine is started.

The WF setting-execution screen 151 includes a device list area 151*a*, a WF executability checking button 151*b*, a WF execution button 151*c*, and a device change button 151*d*. Nonetheless, in this regard, it is noted that FIG. 2A shows indispensable elements for describing distinct features according to aspects of the present disclosure but may not show all elements included in the WF setting-execution screen 151.

The device list area 151*a* is configured to display a list of devices 200 registered in the smartphone 100. The WF executability checking button 151*b* is configured to, when operated, provide an instruction to check whether a WF is executable. The WF execution button 151*c* is configured to, when operated, provide an instruction to execute the WF. The device change button 151*d* is configured to, when operated, provide an instruction to change a device selected for the WF to another device.

Specifically, FIG. 2A illustrates a state of the WF setting-execution screen 151 when a user has selected one of a plurality of WFs registered in the storage 180. Among a plurality of devices 200 displayed in the device list area 151*a*, the MFP 200*b* (DEF-xxxx) provided with a black star mark ★ is a selected device (hereinafter referred to as a "WF execution device") to perform the WF.

FIGS. 2B and 2C illustrate pop-up windows 153 and 154 for error displays on the display 150, respectively. Details about the error displays will be described later along with explanations of S10 and S12 in FIG. 3A.

FIG. 2D shows an example of a default device setting screen 155 to be displayed when a default device setting process (see FIG. 5) is started.

The default device setting screen 155 includes a device list area 155*a* and a default device change button 155*b*. Nonetheless, in this regard, it is noted that FIG. 2D shows indispensable elements for explaining distinct features according to aspects of the present disclosure but may not show all elements included in the default device setting screen 155.

The device list area 155*a* is configured to display a list of the devices 200 registered in the smartphone 100, in the same manner as the device list area 151*a* in FIG. 2A. Nonetheless, it is noted that in the device list area 155*a*, the MFP 200*a* (ABC-1234) selected as a default device is provided with a star mark ☆. The default device change button 155*b* is configured to, when operated, provide an instruction to change a device selected as a default device to another device.

Figure 3A:
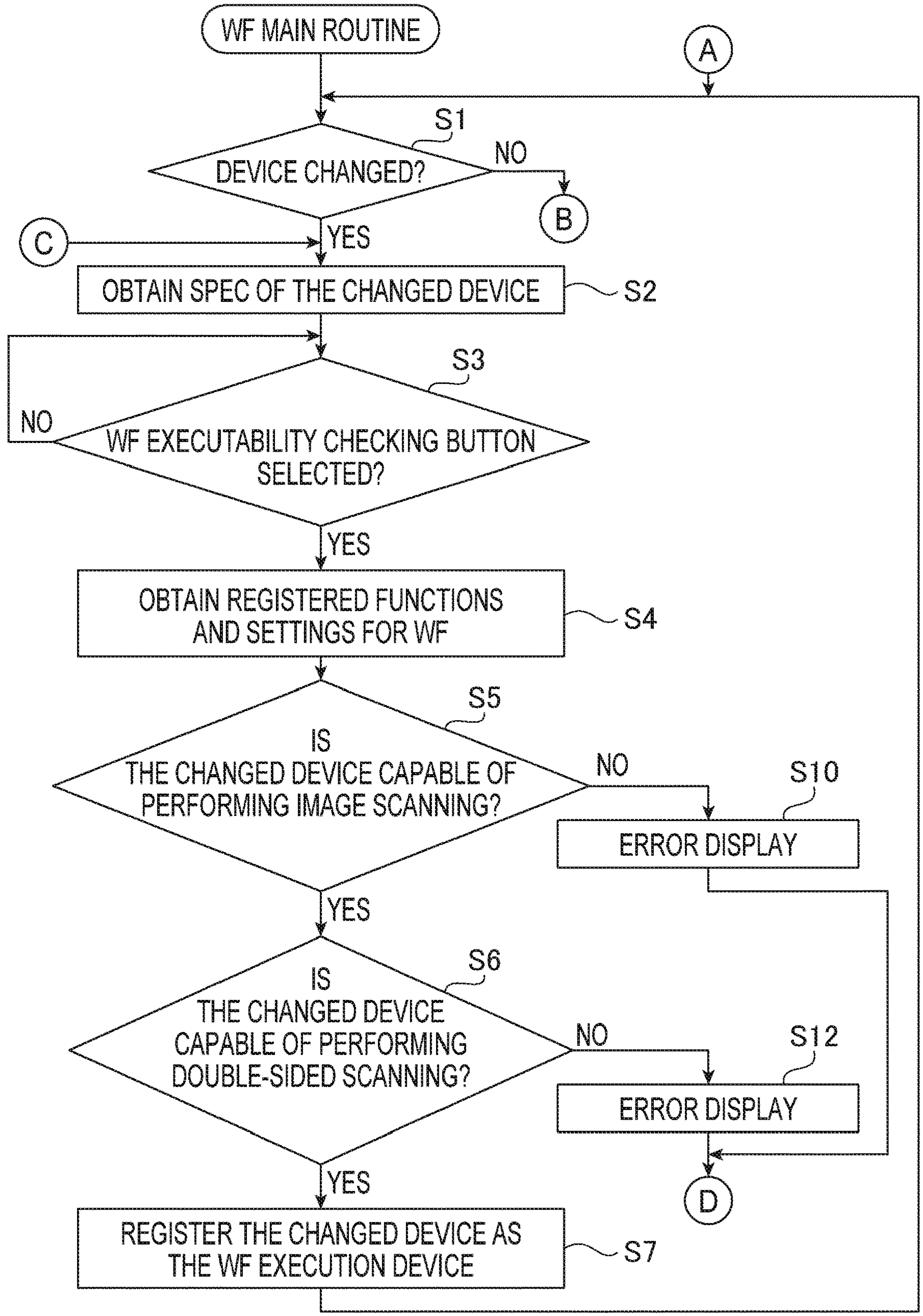
FIGS. 3A to 3C are flowcharts showing a procedure of a WF ("WF" is an abbreviation of "workflow") main routine to be performed by the smartphone executing the information processing program, in the illustrative embodiment according to one or more aspects of the present disclosure.
Figure 3B:
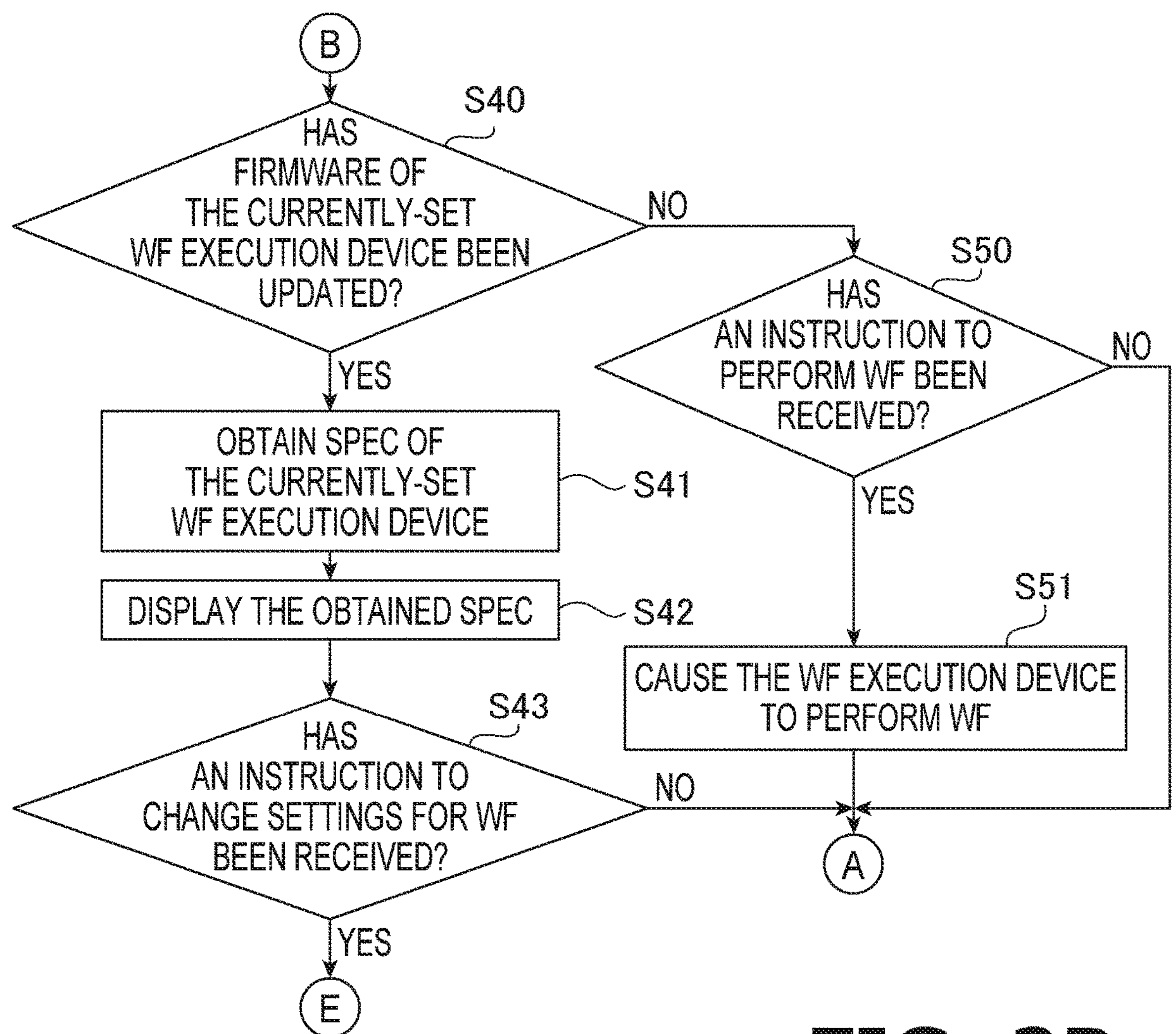
Figure 3C:
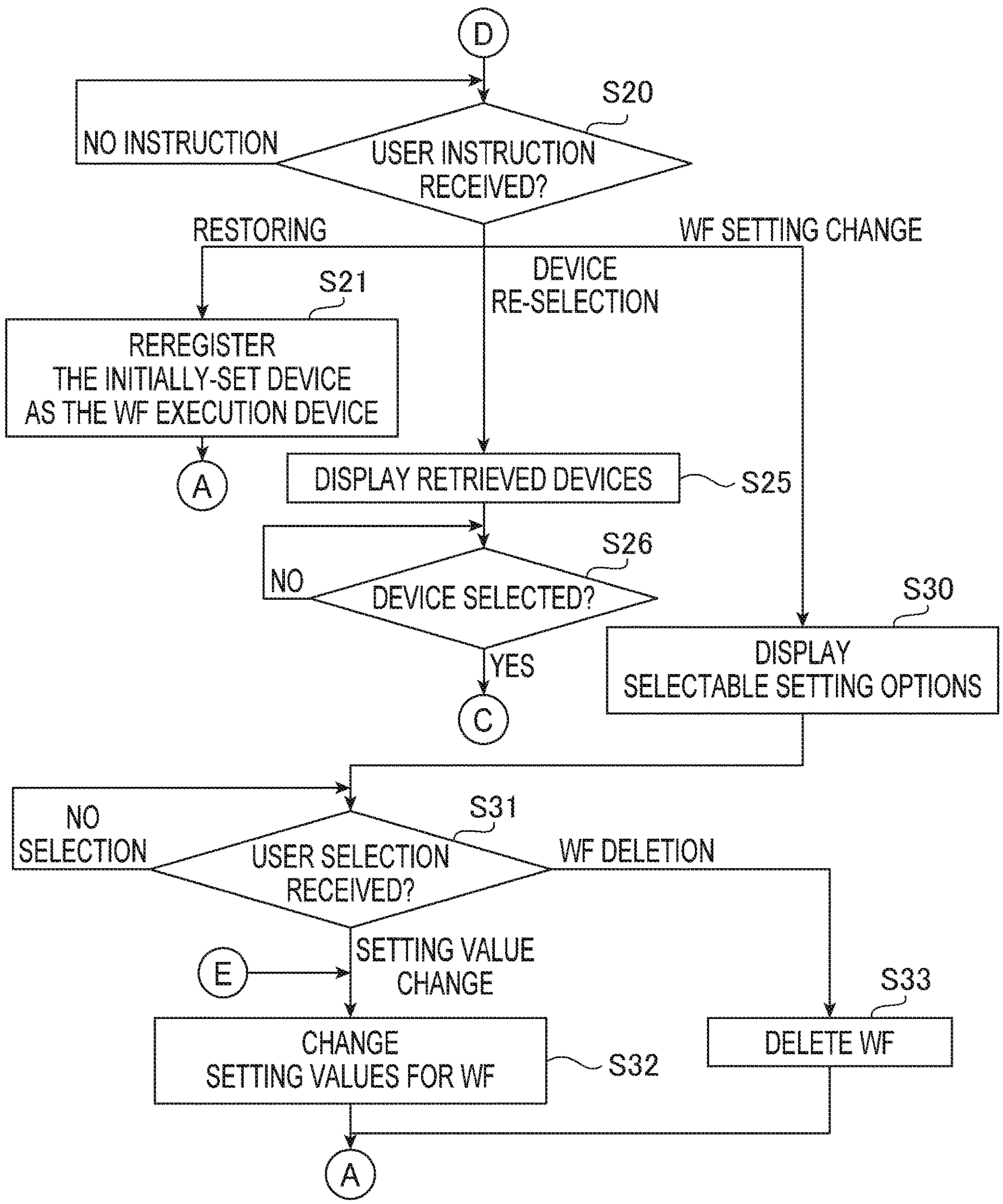

FIGS. 3A to 3C are flowcharts showing a procedure of the WF main routine. As described above, the WF main routine is started in response to the user tapping the WF icon (not shown).

In the WF main routine shown in FIGS. 3A to 3C, the CPU 110*a* of the controller 110 first determines whether the WF execution device has been changed (S1). For instance, when the device change button 151*d* is tapped after one of the devices 200 displayed in the device list area 151*a* has been selected, the WF execution device is changed from the currently-set device to the newly-selected device.

FIG. 2A shows a state of the WF setting-execution screen 151 after the WF execution device has been changed from one device to another. Specifically, FIG. 2A illustrates a state of the WF setting-execution screen 151 in a case where the WF execution device to perform the selected WF has been changed from the initially-set MFP 200*a* to the newly-selected MFP 200*b* (hereinafter, which may be referred to as the "changed device 200").

When determining that the WF execution device has been changed (S1: Yes), the CPU 110*a* obtains specifications of the changed device 200 (i.e., the MFP 200*b*) (S2). Specifically, in the illustrative embodiment, the CPU 110*a* sends to the MFP 200*b* a packet for requesting acquisition of the specifications of the MFP 200*b* via the communication I/F 120 in a unicast transmission method, and receives from the MFP 200*b* a packet containing information on the specifications of the MFP 200*b*.

The CPU 110*a* waits until the WF executability checking button 151*b* is selected (tapped) (S3: No). When determining that the WF executability checking button 151*b* has been selected (S3: Yes), the CPU 110*a* goes to S4.

The CPU 110*a* obtains registered functions and settings for the currently-selected WF (S4). The registered functions represent one or more specific functions registered as functions used for a sequence of processes contained in the WF among the available functions (e.g., the printing function, the scanning function, and the facsimile function) of the device 200 set for the WF. The settings include setting values for the registered functions and the setting of the selected WF execution device. Examples of the setting values may include, but are not limited to, color printing/monochrome printing, double-sided printing/single-side printing, print quality, a printing speed, and sheet quality for the printing function, and double-sided scanning/single-side scanning, a resolution, the number of colors, a document size, brightness, and contrast for the scanning function. In the illustrative embodiment, the following description will be provided based on an example in which the scanning function is registered for the currently-selected WF, and the double-sided scanning is set. Nonetheless, it is noted that the above example is presented for the sake of simple explanation and that the printing function may be registered for an actual WF, in addition to or instead of the scanning function. The same may apply to the facsimile function. Furthermore, the same may apply to setting values for each function.

Subsequently, the CPU 110*a* determines whether the changed device 200 is capable of performing image scanning, based on the specifications, obtained in S2, of the changed device 200 (S5). When determining that the changed device 200 is capable of performing image scanning (S5: Yes), the CPU 110*a* determines whether the changed device 200 is capable of performing double-sided scanning (S6). When determining that the changed device 200 is capable of performing double-sided scanning (S6: Yes), the CPU 110*a* registers the changed device 200 (i.e., the MFP 200*b*) as the WF execution device in the settings for the WF (S7). Afterward, the CPU 110*a* goes back to S1.

Meanwhile, when determining that the changed device 200 is uncapable of performing image scanning (S5: No), the CPU 110*a* controls the display 150 to show an error display (S10). Thereafter, the CPU 110*a* goes to S20 in FIG. 3C. FIG. 2B shows an example of the error display to be displayed on the pop-up window 153 in S10. The pop-up window 153 displays thereon a restoring button 153*a* and a device re-selection button 153*b*, as well as a warning message "The changed device is uncapable of performing image scanning."

The restoring button 153*a* is configured to, when operated, provide an instruction to change the WF execution device from the changed device 200 (i.e., the MFP 200*b*) back to the initially-set device 200 (i.e., the MFP 200*a*). The device re-selection button 153*b* is configured to, when operated, provide an instruction to change the WF execution device from the changed device 200 to yet another device 200.

If the CPU 110*a* goes to S10, it means that the changed device 200 does not have the scanning function. In the illustrative embodiment, the changed device 200 is the MFP 200*b*, which has the scanning function. Therefore, in the illustrative embodiment, the CPU 110*a* does not ever go to S10. However, in another case where the user changes the WF execution device from the initially-set device 200 (i.e., the MFP 200*a*), for instance, to the printer 200*c* not having the scanning function, the CPU 110*a* goes to S10. In this case, since the printer 200*c* is uncapable of performing the currently-selected WF, the user may have the two options as shown in FIG. 2B, i.e., one option to restore the WF execution device to the initially-set device 200, and the other option to reselect a device 200 having the scanning function as the WF execution device. Moreover, as will be described later, the user may have further options such as an option to change setting value(s) for the currently-selected WF (see S32 in FIG. 3C) and an option to delete the currently-selected WF (see S33 in FIG. 3C).

Meanwhile, when determining that the changed device 200 is uncapable of performing double-sided scanning (S6: No), the CPU 110*a* controls the display 150 to show an error display (S12). After that, the CPU 110*a* goes to S20. FIG. 2C shows an example of the error display to be displayed on the pop-up window 154 in S12. The pop-up window 154 displays thereon a restoring button 154*a* and a WF setting change button 154*b*, as well as a warning message "The changed device is uncapable of performing double-sided scanning."

The restoring button 154*a* is configured to, when operated, provide an instruction to change the WF execution device from the changed device 200 back to the initially-set device 200, in the same manner as the restoring button 153*a*. The WF setting change button 154*b* is configured to, when operated, provide an instruction to change the setting values for the WF, with the changed device 200 being maintained as the WF execution device.

If the CPU 110*a* goes to S12, it means that the changed device 200 has the scanning function but is not capable of double-sided scanning. In this case, since the changed device 200 is uncapable of performing the currently-selected WF, the user may have the two options as shown in FIG. 2C, i.e., one option to restore the WF execution device to the initially-set device 200, and the other option to change setting value(s) for the WF. As described above, "double-sided scanning" is set as a setting value for the currently-selected WF. Accordingly, if the setting value is changed from "double-sided scanning" to "single-side scanning," the changed device 200 is allowed to perform the WF for which the setting value has been changed. Therefore, the option to change setting value(s) for the WF may be included in available options in this case. Furthermore, the available options may include an option to reselect a device 200 capable of performing double-sided scanning as the WF execution device.

Thus, in the illustrative embodiment, when the WF execution device is changed from one device to another, registration of the changed device 200 for the currently-selected WF and determination as to whether the changed device 200 is capable of performing image scanning and double-sided scanning are not automatically performed. In other words, the registration of the changed device 200 for the currently-selected WF and the determination as to whether the changed device 200 is capable of performing image scanning and double-sided scanning are not performed until the user selects the WF executability checking button 151*b*. Thereby, it is possible to prevent a process unintended by the user from being automatically performed. Nonetheless, the aforementioned registration and determination may be automatically performed. In this case, it is preferable to indicate what kind of process has been automatically performed.

In S20 (see FIG. 3C), the CPU 110*a* waits until the CPU 110*a* receives a user instruction (S20: No instruction). When having received a user instruction, the CPU 110*a* goes to a step corresponding to the received user instruction. Specifically, when the WF main routine advances to S20, one of the pop-up windows 153 and 154 shown in FIGS. 2B and 2C, respectively, is displayed on the display 150. The user instruction to be received in S20 is provided in response to one of the buttons being tapped such as the restring button 153*a* and the device re-selection button 153*a* displayed on the pop-up window 153 and the restoring button 154*a* and the WF setting change button 154*b* displayed on the pop-up window 154.

When the restoring button 153*a* or 154*a* is tapped, the CPU 110*a* reregisters the initially-set device 200 as the WF execution device (S21). Thereafter, the CPU 110*a* goes back to S1.

When the device re-selection button 153*b* is tapped, the CPU 110*a* searches for devices 200 communicably connected with the smartphone 100, and causes the display 150 to display found devices 200 (S25). Specifically, the CPU 110*a* detects communicable devices 200 by broadcasting packets via the communication I/F 120 and receiving responses to the packets via the communication I/F 120. After S25, the CPU 110*a* goes to S26.

When the WF setting change button 154*b* is tapped, the CPU 110*a* controls the display 150 to display a WF setting change screen (not shown) (S30). The WF setting change screen displays thereon selectable setting options of the changed device 200. After S30, the CPU 110*a* goes to S31.

In S26, the CPU 110*a* waits until the user makes a selection from a list of the communicable devices 200 found in S25 (S26: No). When one of the found devices 200 has been selected (S26: Yes), the CPU 110*a* goes to S2 (see FIG. 3A). The details about S2 and the subsequent steps have been described above, and therefore, explanations thereof are omitted.

In S31, the CPU 110*a* waits until the user selects one of the selectable setting options displayed on the WF setting change screen in S30 (S31: No selection). When one of the selectable setting options is selected, the CPU 110*a* goes to a step corresponding to the selected setting option. In the illustrative embodiment, the selectable setting options displayed on the WF setting change screen in S30 includes an option to change setting value(s) for the WF and an option to delete the WF.

When the user selects the option to change setting value(s) for the WF, the CPU 110*a* changes one or more setting values for the WF (S32). Afterward, the CPU 110*a* goes back to S1.

Meanwhile, when the user selects the option to delete the WF, the CPU 110*a* deletes the selected WF (S33). Thereafter, the CPU 110*a* goes back to S1.

When determining in S1 that the WF execution device has not been changed (S1: No), the CPU 110*a* determines whether firmware of the currently-set WF execution device (i.e., the MFP 200*a*) has been updated (S40). Specifically, for instance, the CPU 110*a* may be periodically monitoring a state of each device 200 by executing a routine different from the WF main routine shown in FIGS. 3A to 3C. Thereby, the CPU 110*a* may determine whether firmware of each of the devices 200 including the currently-set WF execution device has been updated.

When determining that the firmware of the currently-set WF execution device has been updated (S40: Yes), the CPU 110*a* obtains specifications of the WF execution device (S41). In S41, the CPU 110*a* obtains the specifications of the WF execution device in substantially the same method as exemplified in S2. Therefore, a detailed explanation of the method is omitted.

Subsequently, the CPU 110*a* displays the obtained specifications of the WF execution device (S42). For instance, when the WF execution device has become capable of double-sided printing due to the updated firmware, the CPU 110*a* may cause the display 150 to display the specifications of the WF execution device along with a message such as "Double-sided printing is available. Would you like to use it in the WF?" to suggest use of double-sided printing in the WF.

Subsequently, the CPU 110*a* determines whether the CPU 110*a* has received an instruction to change setting value(s) from the user (S43). When determining that the CPU 110*a* has received an instruction to change setting value(s) from the user (S43: Yes), the CPU 110*a* goes to S32 (see FIG. 3C). Since the process in S32 has been described above, an explanation thereof is omitted.

Meanwhile, when determining that the CPU 110*a* has not received an instruction to change setting value(s) from the user (S43: No), the CPU 110*a* goes back to S1.

Meanwhile, when determining in S40 that the firmware of the currently-set WF execution device has not been updated (S40: No), the CPU 110*a* determines whether the CPU 110*a* has received an instruction to perform the WF (S50). For instance, the instruction to perform the WF may be issued in response to the user tapping the WF execution button 151*c*. When determining that the CPU 110*a* has received an instruction to perform the WF (S50: Yes), the CPU 110*a* causes the WF execution device to perform the WF (S51). Thereafter, the CPU 110*a* goes back to S1. Meanwhile, when determining that the CPU 110*a* has not received an instruction to perform the WF (S50: No), the CPU 110*a* goes back to S1.

Figure 4:
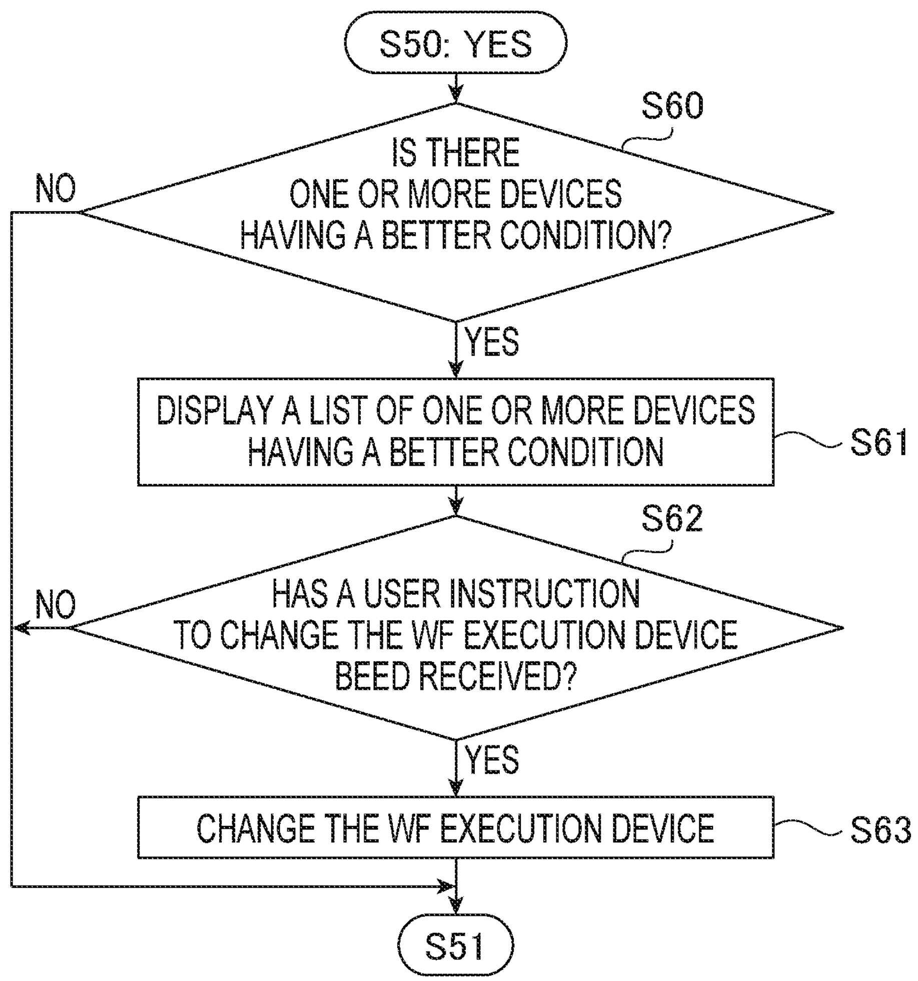
FIG. 4 is a flowchart showing a procedure of an additional process executable in the WF main routine in the illustrative embodiment according to one or more aspects of the present disclosure.

FIG. 4 is a flowchart showing a procedure of an additional process that may be performed between S50 and S51 (see FIG. 3B) in the WF main routine.

When determining in S50 that the CPU 110*a* has received an instruction to perform the WF (S50: Yes), the CPU 110*a* may determine whether there exists one or more devices 200 having a better condition for performing the WF than the currently-set WF execution device (S60). Examples of "a better condition" may include, but are not limited to, a higher scanning speed, a higher scanning resolution (even at the same scanning speed), and a higher level of scan quality (even at the same scanning speed) for the scanning function. Further, the examples of "a better condition" may include, but are not limited to, a higher printing speed, a higher level of print quality, and a larger number of usable sheet types for the printing function. Further, when there exists a successor model to the currently-set WF execution device, the successor model may be "a better condition." Moreover, when there exists a device 200 having a larger number of selectable setting values for the WF, the larger number of selectable setting values for the WF may be "a better condition."

When determining that there exists one or more devices 200 having a better condition (S60: Yes), the CPU 110*a* controls the display 150 to display a list of the one or more devices 200 (S61). When the user makes a selection from among the one or more devices 200 listed on the display 150 and provides an instruction to change the WF execution device from the currently-set device 200 to the newly-selected device 200 (S62: Yes), the CPU 110*a* registers the newly-selected device 200 as the WF execution device in the settings for the selected WF (S63). Afterward, the CPU 110*a* goes to S51.

Meanwhile, when determining that there does not exist any device 200 having a better condition (S60: No), or when there exists one or more devices 200 having a better condition (S60: Yes) but the user does not provide an instruction to change the WF execution device (S62: No), the CPU 110*a* goes to S51 without executing S63.

Figure 5:
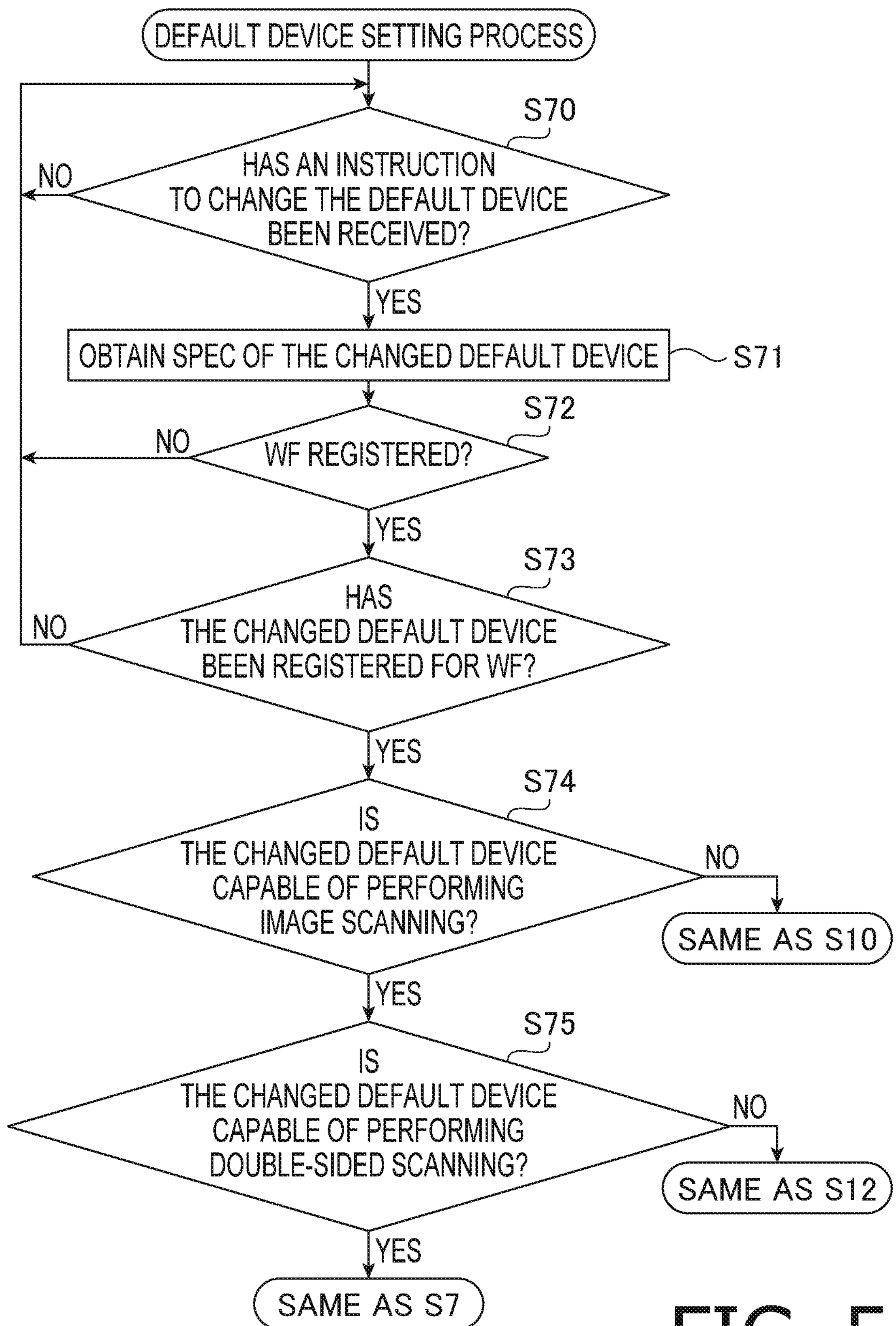
FIG. 5 is a flowchart showing a procedure of a default device setting process to be performed by the smartphone executing the information processing program, in the illustrative embodiment according to one or more aspects of the present disclosure.

FIG. 5 is a flowchart showing a procedure of the default device setting process. The default device setting process is started in response to a user operation of tapping the aforementioned default device setting icon (not shown).

In the default device setting process shown in FIG. 5, the CPU 110*a* first determines whether the CPU 110*a* has received an instruction to change the default device (S70). For instance, the default device may be changed when the user taps the default device change button 155*b* on the default device setting screen 155 after selecting one of the devices 200 displayed in the device list area 155*a*.

FIG. 2D shows an example of the default device setting screen 155 before the default device is changed. Namely, an initially-set default device is the MFP 200*a* (ABC-1234). The following description will be provided under an assumption that the default device is changed from the MFP 200*a* to the MFP 200*b* (DEF-xxxx) (hereinafter, which may be referred to as the "changed default device").

When determining that the CPU 110*a* has received an instruction to change the default device (S70: Yes), the CPU 110*a* obtains specifications of the changed default device (i.e., the MFP 200*b*) (S71). Since a process in S71 is substantially the same as the process in S2 (see FIG. 3A), an explanation of the process in S71 is omitted.

Subsequently, the CPU 110*a* determines whether a WF is registered (S72). When determining that a WF is registered (S72: Yes), the CPU 110*a* determines whether the default device is registered for the WF (S73).

When determining that the default device is registered for the WF (S73: Yes), the CPU 110*a* goes to S74.

Meanwhile, when determining that the CPU 110*a* has not received an instruction to change the default device (S70: No), or determining that a WF is not registered (S72: No), or determining that the default device is not registered for the WF (S73: No), the CPU 110*a* goes back to S70.

The WF accepts registration of a device 200 selected as the WF execution device for the WF, and may also accept registration of a device 200 selected as the default device for the WF. In S73, the CPU 110*a* determines whether the default device is registered for the selected WF. Namely, the default device setting process shown in FIG. 5 is a process to be performed when the default device is changed from the currently-set device 200 to another device 200 in a state where the default device is registered for the selected WF. Specifically, in the steps S70 to S73 of the default device setting process, the CPU 110*a* determines whether the default device has been changed from the currently-set device 200 to another device 200 in a state where the default device is registered for the selected WF.

If the CPU 110*a* advances from S73 to S74, it means that the default device has been changed from the currently-set device 200 to another device 200 in a state where the default device is registered for the selected WF.

Since a process of S74 and the following steps in FIG. 5 is substantially the same as a process of S5 and the following steps in FIG. 3A, an explanation thereof is omitted.

As described above, the information processing program 180*a* of the illustrative embodiment is configured to, when executed by the CPU 110*a*, cause the smartphone 100 to set a selected one (e.g., the MFP 200*a*) of the plurality of devices 200 as a WF execution device to perform a WF registered in the storage 180 (S7, or initial setting), receive a tapping operation to change the WF execution device from the currently-set device 200 to another device 200 (e.g., the MFP 200*b*) among the plurality of devices 200 via the operation I/F 160 (S1: Yes), determine whether the changed device 200 is capable of performing the registered WF (S5, S6), and control the display 150 to display a result of the determination as to whether the changed device 200 is capable of performing the registered WF (S10, S12).

Thus, in the illustrative embodiment, when the WF execution device is changed, it is possible to provide the user with information as to whether the changed device 200 is capable of performing the registered WF.

Further, the information processing program 180*a* of the illustrative embodiment is configured to, when executed by the CPU 110*a*, cause the smartphone 100 to obtain specifications of the changed device 200 (e.g., the MFP 200*b*) from the changed device 200 (S2), and determine whether the changed device 200 is capable of performing the registered WF, based on the obtained specifications of the changed device 200 (S5, S6).

Thereby, it is possible for the smartphone 100 to more exactly determine whether the changed device 200 is capable of performing the registered WF.

Further, the information processing program 180*a* of the illustrative embodiment is configured to, when executed by the CPU 110*a*, cause the smartphone 100 to, set, as the WF execution device, a default device selected from among the plurality of devices, determine, in response to receiving an operation to change the default device from the currently-set device 200 to another device 200 (S70: Yes), whether the changed default device is capable of performing the registered WF (S74, S75).

Thereby, when the default device is changed, it is possible to provide the user with information as to whether the changed default device is capable of performing the registered WF.

Further, the information processing program 180*a* is configured to, when executed by the CPU 110*a*, cause the smartphone 100 to control the display 150 to display the WF executability checking button 151*b* for checking whether the changed device 200 is capable of performing the registered WF, and determine, in response to receiving a tapping operation of tapping the WF executability checking button 151*b* via the operation I/F 160 (S3: Yes), whether the changed device 200 is capable of performing the registered WF (S5, S6).

Thus, the determination as to whether the changed device 200 is capable of performing the registered WF is made after the WF executability checking button 151*b* is tapped. Hence, the user is informed of whether the changed device 200 is capable of performing the registered WF, in accordance with user's intention.

Further, the information processing program 180*a* is configured to, when executed by the CPU 110*a*, cause the smartphone 100 to, when determining that the changed device 200 is uncapable of performing the registered WF, control the display 150 to display selectable setting options executable by the changed device 200, instead of a setting inexecutable by the changed device 200 among the settings for the registered WF (S30).

Thereby, even though there is a setting inexecutable by the changed device 200 among the settings for the registered WF, other selectable setting options executable by the changed device 200 are displayed. Thus, the smartphone 100 with the information processing program 180*a* incorporated is useful when the changed device 200 has to be used.

Further, the information processing program 180*a* is configured to, when executed by the CPU 110*a*, cause the smartphone 100 to receive a selection from among the selectable setting options displayed on the display 150 (S31: Yes, and S32) and send an instruction to perform the WF containing the selected setting option, to the changed device 200 (S51).

Thereby, even though there is a setting inexecutable by the changed device 200 among the settings for the registered WF, other selectable setting options executable by the changed device 200 are displayed, and an instruction to perform the WF containing a selected one of the setting options is provided to the changed device 200. Thus, the smartphone 100 with the information processing program 180*a* incorporated is adapted to a situation where the changed device 200 has to be used.

Further, the information processing program 180*a* is configured to, when executed by the CPU 110*a*, cause the smartphone 100 to, when determining that the changed device 200 is uncapable of performing the registered WF (S5: No, or S6: No), retrieve one or more devices 200 capable of performing the registered WF from among the plurality of devices 200 (S25) and send an instruction to perform the registered WF to a selected one of the retrieved devices 200 (S7, S51).

Thereby, it is possible to cause a device 200 capable of performing the registered WF to perform the WF, without changing the settings for the WF.

Further, the information processing program 180*a* is configured to, when executed by the CPU 110*a*, cause the smartphone 100 to determine whether firmware of the currently-set WF execution device (e.g., the MFP 200*a*) has been updated (S40), when determining that the firmware of the currently-set WF execution device has been updated (S40: Yes), obtain specifications of the currently-set WF execution device with the updated firmware incorporated (S41), control the display 150 to display the obtained specifications of the currently-set WF execution device (S42), receive one or more setting values selected from the displayed specifications of the currently-set WF execution device with the updated firmware incorporated (S43: Yes), and send an instruction to perform the WF for which the settings have been changed with the received setting values, to the currently-set WF execution device (S32, S51).

Thereby, when the specifications, of the currently-set WF execution device with the updated firmware incorporated, are improved, it is possible to cause the currently-set WF execution device to perform the WF with the improved specifications.

Further, the information processing program 180*a* is configured to, when executed by the CPU 110*a*, cause the smartphone 100 to show one or more devices 200 having a better condition for performing the WF than the currently-set WF execution device (S61).

Thereby, it is possible to cause a device having a better condition for performing the WF.

In S61, the information processing program 180*a* may cause, when executed by the CPU 110*a*, the smartphone 100 to show, as the one or more devices 200 having a better condition, one or more devices 200 having a larger number of selectable setting values for the registered WF than the currently-set WF execution device.

Thereby, it is possible to have a wider range of selectable setting values for the WF.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In the aforementioned illustrative embodiment, the smartphone 100 is employed as a terminal device. Nonetheless, examples of the terminal device may include, but are not limited to, a tablet terminal, a PC ("PC" is an abbreviation of "Personal Computer"), and a PDA ("PDA" is an abbreviation of "Personal Digital Assistant"), as well as the smartphone 100.

In the aforementioned illustrative embodiment, the determination (S3) as to whether the WF executability checking button 151*b* has been selected is made after the WF execution device has been changed (S1: Yes). However, the determination as made in S3 may be made between S50 and S51.

In the aforementioned illustrative embodiment, the determination (S40) as to whether the firmware of the currently-set WF execution device has been updated is made prior to the determination (S50) as to whether an instruction to perform the WF has been received. However, the determination as made in S40 may be made between S50 and S51.

In the aforementioned illustrative embodiment, deletion of the currently-selected WF (S33) is made after receipt of an instruction to change the settings for the WF (S30). However, deletion of the currently-selected WF may be included in the options selectable according to a user instruction provided in S20.

The following shows examples of associations between elements exemplified in the aforementioned illustrative embodiment and modifications and elements according to aspects of the present disclosure. The smartphone 100 may be an example of an "information processing device" according to aspects of the present disclosure. The controller 110 may be an example of a "controller" according to aspects of the present disclosure. The CPU 110*a* may be an example of a "processor" according to aspects of the present disclosure. The storage 180 may be an example of a "non-transitory computer-readable medium" according to aspects of the present disclosure. The information processing program 180*a* may be an example of "program instructions" according to aspects of the present disclosure. The storage 180 may be an example of a "storage" according to aspects of the present disclosure. The operation I/F 160 may be an example of an "operation interface" according to aspects of the present disclosure. The display 150 may be an example of a "display" according to aspects of the present disclosure. The wireless communication I/F 140 may be an example of a "communication interface" according to aspects of the present disclosure. The WF executability checking button 151*b* may be an example of an "icon" according to aspects of the present disclosure. The WF may be an example of a "particular process" according to aspects of the present disclosure. The WF execution device may be an example of a "target device" according to aspects of the present disclosure. The MFP 200*a* may be an example of a "first device" according to aspects of the present disclosure. The MFP 200*b* may be an example of a "second device" according to aspects of the present disclosure.

What is claimed is:

1. A non-transitory computer-readable medium storing program instructions executable by a processor of an information processing device, the information processing device comprising a storage, an operation interface, a display, and a communication interface configured to communicate with a plurality of devices, the program instructions being configured to, when executed by the processor, cause the information processing device to:

set a first device selected from among the plurality of devices as a target device to perform a particular process registered in the storage, the particular process containing a sequence of processes, the particular process being registered in association with one or more specific functions used for the sequence of processes among a plurality of functions of the first device and with setting values for the one or more specific functions;

when receiving an operation to change the target device from the first device to a second one of the plurality of devices via the operation interface, obtain specifications of the second device, from the second device;

obtain, from the storage, the one or more specific functions used for the sequence of processes contained in the particular process and the setting values for the one or more specific functions;

determine whether the second device is capable of performing the particular process executable by the first device if the target device to perform the particular process is changed from the first device to the second device, based on the obtained specifications of the second device, the obtained one or more specific functions and the obtained setting values;

control the display to display a result of the determination as to whether the second device is capable of performing the particular process; and control the display to display one or more devices having a better condition for performing the particular process than the target device even though the target device is capable of performing the particular process, wherein when determining that the second device is uncapable of performing the particular process, cause the display to display a screen having a restoring button and a device re-selection button, the restoring button for selecting the first device and the device re-selection button for selecting another of the plurality of devices.

2. The non-transitory computer-readable medium according to claim 1, wherein the program instructions are further configured to, when executed by the processor, cause the information processing device to:

when determining that the second device is capable of performing the particular process, set the second device as the target device, and send an instruction to perform the particular process to the second device; and when not receiving the operation to change the target device, send the instruction to perform the particular process to the first device.

3. The non-transitory computer-readable medium according to claim 1, wherein the program instructions are further configured to, when executed by the processor, cause the information processing device to:

when a default device for the information processing device is selected from among the plurality of devices and is set as the target device, receive an operation to change the default device from one device to another among the plurality of devices; and determine whether the changed default device is capable of performing the particular process.

4. The non-transitory computer-readable medium according to claim 1, wherein the program instructions are further configured to, when executed by the processor, cause the information processing device to:

control the display to display an icon for checking whether the second device is capable of performing the particular process; and in response to receiving an operation to the icon via the operation interface, determine whether the second device is capable of performing the particular process.

5. The non-transitory computer-readable medium according to claim 1, wherein the program instructions are further configured to, when executed by the processor, cause the information processing device to:

when determining that the second device is uncapable of performing the particular process, control the display to display selectable setting options executable by the second device, instead of a setting inexecutable by the second device among settings for the particular process.

6. The non-transitory computer-readable medium according to claim 5, wherein the program instructions are further configured to, when executed by the processor, cause the information processing device to:

receive a selection from among the selectable setting options displayed on the display; and send an instruction to perform the particular process containing the selected setting option, to the second device.

7. The non-transitory computer-readable medium according to claim 1, wherein the program instructions are further configured to, when executed by the processor, cause the information processing device to:

when determining that the second device is uncapable of performing the particular process, retrieve one or more devices capable of performing the particular process from among the plurality of devices; and send an instruction to perform the particular process to a selected one of the retrieved one or more devices.

8. The non-transitory computer-readable medium according to claim 1, wherein the program instructions are further configured to, when executed by the processor, cause the information processing device to:

determine whether firmware of the target device has been updated;

when determining that the firmware of the target device has been updated, obtain specifications of the target device with the updated firmware incorporated;

control the display to display the obtained specifications of the target device;

receive one or more setting values selected from the displayed specifications of the target device with the updated firmware incorporated; and send an instruction to perform the particular process for which settings have been changed with the received one or more setting values, to the target device.

9. The non-transitory computer-readable medium according to claim 1, wherein the better condition is a larger number of selectable setting values for the particular process than the target device.

10. An information processing device comprising:

a storage;

an operation interface;

a display;

a communication interface configured to communicate with a plurality of devices; and a controller comprising a hardware processor configured to:

set a first device selected from among the plurality of devices as a target device to perform a particular process registered in the storage, the particular process containing a sequence of processes, the particular process being registered in association with one or more specific functions used for the sequence of processes among a plurality of functions of the first device and with setting values for the one or more specific functions;

when receiving an operation to change the target device from the first device to a second one of the plurality of devices via the operation interface, obtain specifications of the second device, from the second device;

obtain, from the storage, the one or more specific functions used for the sequence of processes contained in the particular process and the setting values for the one or more specific functions;

determine whether the second device is capable of performing the particular process executable by the first device if the target device to perform the particular process is changed from the first device to the second device, based on the obtained specifications of the second device, the obtained one or more specific functions and the obtained setting values;

control the display to display a result of the determination as to whether the second device is capable of performing the particular process; and control the display to display one or more devices having a better condition for performing the particular process than the target device even though the target device is capable of performing the particular process, wherein when determining that the second device is uncapable of performing the particular process, cause the display to display a screen having a restoring button and a device re-selection button, the restoring button for selecting the first device and the device re-selection button for selecting another of the plurality of devices.

11. The information processing device according to claim 10, wherein the controller comprises:

a processor; and a non-transitory computer-readable medium storing program instructions configured to, when executed by the processor, cause the controller to:

set the first device as the target device;

when receiving the operation to change the target device, obtain specifications of the second device, from the second device;

obtain, from the storage, the one or more specific functions used for the sequence of processes contained in the particular process and the setting values for the one or more specific functions;

determine whether the second device is capable of performing the particular process executable by the first device if the target device to perform the particular process is changed from the first device to the second device, based on the obtained specifications of the second device, the obtained one or more specific functions and the obtained setting values;

control the display to display the result of the determination as to whether the second device is capable of performing the particular process; and control the display to display one or more devices having a better condition for performing the particular process than the target device even though the target device is capable of performing the particular process, wherein when determining that the second device is uncapable of performing the particular process, cause the display to display a screen having a restoring button and a device re-selection button, the restoring button for selecting the first device and the device re-selection button for selecting another of the plurality of devices.

12. A method implementable on a processor of an information processing device comprising a storage, an operation interface, a display, and a communication interface configured to communicate with a plurality of devices, the method comprising:

setting a first device selected from among the plurality of devices as a target device to perform a particular process registered in the storage, the particular process containing a sequence of processes, the particular process being registered in association with one or more specific functions used for the sequence of processes among a plurality of functions of the first device and with setting values for the one or more specific functions;

when receiving an operation to change the target device from the first device to a second one of the plurality of devices via the operation interface, obtaining specifications of the second device, from the second device;

obtaining, from the storage, the one or more specific functions used for the sequence of processes contained in the particular process and the setting values for the one or more specific functions;

determining whether the second device is capable of performing the particular process executable by the first device if the target device to perform the particular process is changed from the first device to the second device, based on the obtained specifications of the second device, the obtained one or more specific functions and the obtained setting values;

controlling the display to display a result of the determination as to whether the second device is capable of performing the particular process; and controlling the display to display one or more devices having a better condition for performing the particular process than the target device even though the target device is capable of performing the particular process, wherein when determining that the second device is uncapable of performing the particular process, causing the display to display a screen having a restoring button and a device re-selection button, the restoring button for selecting the first device and the device re-selection button for selecting another of the plurality of devices.

* * * * *